Sept. 4, 1934.   H. A. THOMPSON   1,972,749
APPARATUS FOR DECREASING RAIL CONTACT RESISTANCE Filed June 15, 1932

INVENTOR
Howard A. Thompson
BY
HIS ATTORNEY

Patented Sept. 4, 1934

1,972,749

UNITED STATES PATENT OFFICE 1,972,749

APPARATUS FOR DECREASING RAIL CONTACT RESISTANCE

Howard A. Thompson, Edgewood, Pa., assignor to The Union Switch & Signal Company, Swissvale, Pa., a corporation of Pennsylvania Application June 15, 1932, Serial No. 617,359

7 Claims. (Cl. 246—34)

My invention relates to apparatus for decreasing rail contact resistance, and more specifically to apparatus for improving track circuit shunting by light weight rail vehicles.

I will describe one form of apparatus for decreasing rail contact resistance embodying my invention, and will then point out the novel features thereof in claims.

Figure 1:
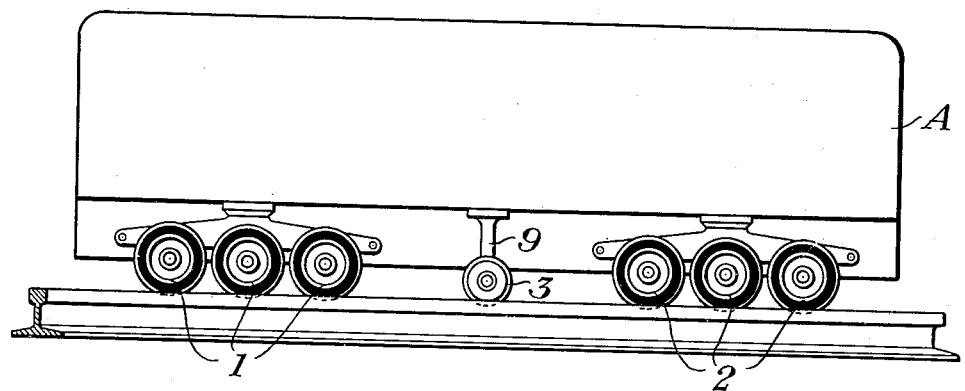
Figure 2:
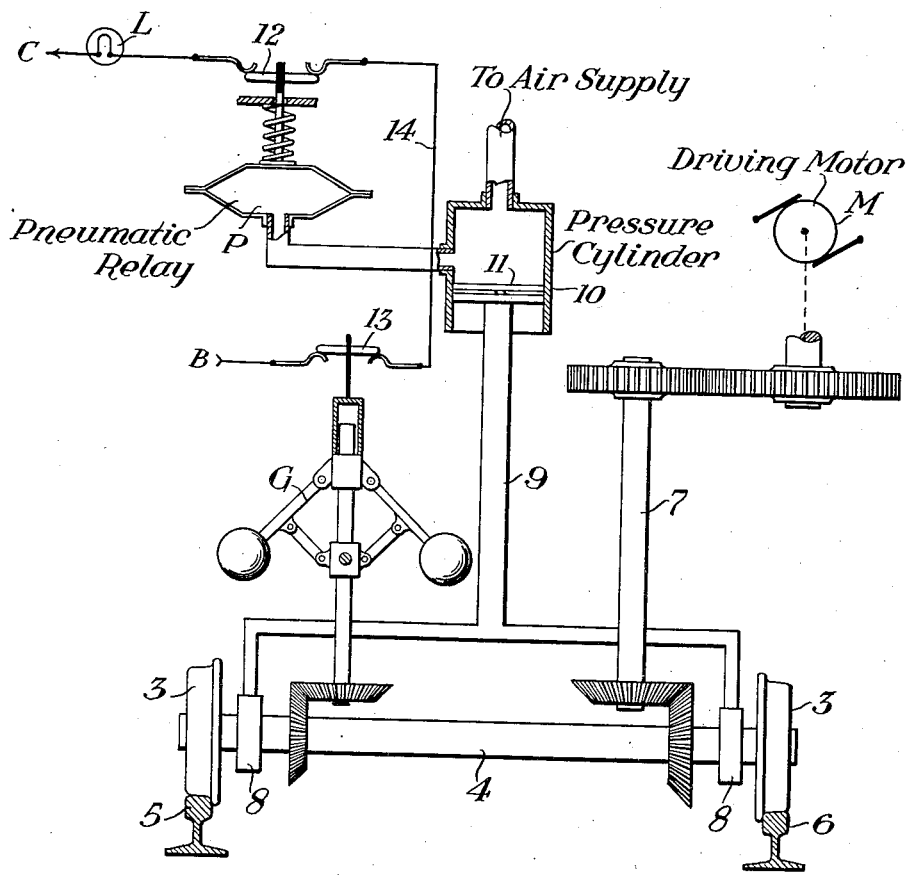

In the accompanying drawing, Fig. 1 shows in elevation a rail vehicle equipped with apparatus embodying my invention. Fig. 2 is a diagrammatic view showing in detail the apparatus for decreasing rail contact resistance embodying my invention.

For most railway signaling purposes, where heavy rolling stock of the ordinary type is used, it is usual to place dependence upon the wheels and axles of the locomotive or cars to provide a satisfactory low resistance shunt path from rail to rail for releasing the track relay in order to obtain an indication of the occupancy of the track circuit. It has been found, however, that when a light weight rail vehicle, such as the gas-electric car, for example, is used, the shunting obtained therewith is not always dependable, the weight of such a vehicle being insufficient to destroy the high resistance film which forms on a clean rail surface exposed to atmospheric conditions for a period of time. Also, if the wheels of the car are equipped with pneumatic tires, or other insulating tread material, special means must be provided for shunting the track circuit. My invention provides a method for removing the high resistance film from the traction surfaces of the rails and for effectively shunting the track circuit, irrespective of whether the particular vehicle is equipped with steel tread or pneumatic tread wheels.

Referring to Fig. 1 of the drawing, the reference character A designates a rail vehicle in which the sets of wheels 1 and 2 have rubber tires, therefore making no electrical contact with the rails. In order to obtain track circuit shunting, I provide car A with a pair of metallic wheels 3, in electrical contact with each rail, and electrically connected with each other. The manner in which wheels 3 operate to shunt the track circuit will be more clearly understood in connection with the diagram of Fig. 2.

In Fig. 2 of the drawing, the wheels 3 are mounted rigidly upon an axle 4, for rotation therewith, and make electrical contact with the track at the traction surfaces of rails 5 and 6. The wheels 3 are arranged to be kept in constant rotation in a direction opposite to the direction established by the car travel, and are driven by the motor M through a driving connection 7, at all times, regardless of whether the car is in motion, or is at a standstill. The motor M may be operated from any suitable power source carried aboard the car. Although the reverse direction of rotation of wheels 3 is to be preferred, it is not essential, as either direction of rotation may be used, provided that wheels 3 rotate at such speed that a rubbing effect is produced on the rail, sufficient to remove the surface film.

The axle 4 is supported in a pair of journals 8, carried by a frame 9, this frame being held in position with respect to the car body by a vertical guide which is not shown for simplicity, but which permits vertical movement of the frame 9 in order that wheels 3 may at all times make contact with the rails. An air pressure cylinder 10 coacting with a piston 11 attached to frame 9 is provided for the purpose of insuring positive pressure contact of wheels 3 with the rails, in case the weight of the apparatus is insufficient for the purpose, it being understood that any other suitable form of pressure-producing apparatus can be used as well. The wheels 3 can be made of any suitable current conducting material such as soft steel, bronze, or steel wire, the object being to provide a material sufficiently hard to remove the rail surface film by abrasion, yet sufficiently soft to prevent undue wear of the rail surface.

It will now be apparent that once the resistance film has been removed from the rail surface by rotation of wheels 3 thereagainst, these wheels will form an auxiliary shunt path of negligible resistance from rail to rail, thereby insuring positive release of the track relay and minimizing traffic hazards.

In order to make certain that air of the requisite pressure is being applied to the frame 9, I have provided a pneumatic relay P which maintains a contact 12 in the closed position at all times when the pressure is at or above a predetermined value. Also, I have provided a governor G which may be operated from any part of the mechanism driven by motor M, such as axle 4 for example, for checking that the wheels 3 are being rotated at the proper speed for satisfactory rail film removal. When the speed of axle 4 is sufficiently high, governor G will maintain contact 13 in the closed position, and if the air pressure is also at the proper value, indicator L will remain energized over a circuit which starts at one terminal B of a source, contact 13 of governor G, wire 14, contact 12 of pneumatic relay P, and indicator L, to the other terminal C of the source. Should the indicator L become deenergized, either through the opening of contact 12 or contact 13, the operator of the car will be immediately apprised of the fact that a latent possibility of imperfect shunting exists, so that he can stop the car, or take any other desired action to remedy the trouble.

One advantage of apparatus embodying my invention is that it can be used to improve shunting on any type of rail vehicle, whether light or heavy, and regardless of the type of tread used on the wheels, whether of the nonconducting, or of the conducting type. A further advantage is that positive shunting can be obtained with the car at a standstill, under which condition it is ordinarily difficult to obtain a high degree of shunting protection because it is possible that the wheels of a car may come to rest upon a portion of the rail surface having a scale or other high resistance layer thereon, thereby failing to release the track relay.

Although I have herein shown and described only one form of apparatus for decreasing rail contact resistance embodying my invention, it is understood that various changes and modifications may be made therein within the scope of the appended claims without departing from the spirit and scope of my invention.

Having thus described my invention, what I claim is:

1. In combination with a stretch of railway track, a rail vehicle the running wheels of which cannot be depended upon to shunt the rails of said track, a pair of conducting wheels electrically connected with each other, one for each rail of said track and carried by said vehicle in such manner as to make contact with the track rails, and means for rotating said wheels independently of the application of motive power for driving said vehicle whereby the rail surface film is removed by friction to improve shunting of said track by said wheels.

2. In combination with a stretch of railway track, a rail vehicle the running wheels of which cannot be depended upon to shunt the rails of said track, means carried by said vehicle for abrading the rail surface to decrease the contact resistance thereof, said means comprising a conducting member in frictional contact with each rail, and means for imparting a movement to said abrading means relative to the rail surface for removing the rail surface film, said movement being imparted independently of the application of motive power for driving said vehicle, thereby providing a low resistance shunt path from rail to rail.

3. In combination with a stretch of railway track, a rail vehicle the running wheels of which cannot be depended upon to shunt the rails of said track, a rotatable conducting member carried by the vehicle and in contact with each rail of said track, and means for rotating said member independently of the application of motive power for driving said vehicle whereby to burnish the rail surface to improve the shunting of said track by said member.

4. In combination with a stretch of railway track, a rail vehicle, a rotatable conducting member carried by the vehicle and in contact with each rail of said track, and means for rotating said member independently of the movement of the vehicle and in a direction opposed to the direction of vehicle travel for burnishing the rail surface thereby improving the shunting of said track by said member.

5. In combination with a stretch of railway track, a rail vehicle, means carried by said vehicle for abrading the rail surface, said means comprising a shunt bar in electrical connection with the rails for shunting said track, a source of fluid pressure upon said vehicle, means for applying pressure from said source to said shunt bar for producing a pressure contact of said shunt bar with the rails, and an indicator governed by said fluid pressure.

6. In combination with a stretch of railway track, a rail vehicle, a rotatable conducting member carried by the vehicle and in contact with each rail of said track, means for rotating said member independently of the movement of the vehicle for burnishing the rail surface to improve the shunting of said track by said member, and an indicator governed by said member responsive to the speed of rotation thereof.

7. In combination with a stretch of railway track, a rail vehicle, a rotatable conducting member carried by the vehicle and in contact with each rail of said track, a source of fluid pressure upon said vehicle, means for applying pressure from said source to said member for producing a pressure contact of said member with the rails, a first contact governed by the pressure applied to said member which becomes closed when the pressure exceeds a predetermined value, means for rotating said member independently of the movement of the vehicle for burnishing the rail surface to improve the shunting of said track by said member, a second contact governed by said member which becomes closed when the speed of rotation of the member exceeds a predetermined value, an indicator, and means governed by said first and said second contacts for actuating said indicator.

HOWARD A. THOMPSON.